United States Patent [19]

Leaf

[11] Patent Number: 4,494,895

[45] Date of Patent: Jan. 22, 1985

[54] PORTABLE DRILL PRESS MECHANISM

[76] Inventor: Arthur L. Leaf, 1009 Villa Ave., San Jose, Calif. 95126

[21] Appl. No.: 464,200

[22] Filed: Feb. 7, 1983

[51] Int. Cl.[3] ............................................. B23B 45/14

[52] U.S. Cl. ..................................... 408/236; 408/712

[58] Field of Search ................. 408/103, 111, 713, 99, 408/100, 105, 103, 110, 94, 702, 90, 89, 88, 79, 80, 81, 82, 83, 93, 108, 234, 236

[56] References Cited

U.S. PATENT DOCUMENTS

| | | | |
|---|---|---|---|
| 2,625,063 | 1/1953 | Hanson | 408/712 X |
| 2,909,083 | 10/1959 | Chestnut | 408/236 |
| 2,925,001 | 2/1960 | Johnson | 408/712 X |
| 3,329,043 | 7/1967 | Stanford | 408/100 X |
| 3,552,239 | 1/1971 | Yeaman et al. | 408/103 |
| 3,810,710 | 5/1974 | Ennemoser | 408/111 |
| 3,890,058 | 6/1975 | Self et al. | 408/712 X |
| 4,010,943 | 3/1977 | Eft | 408/712 X |
| 4,222,687 | 9/1980 | Williams | 408/79 |
| 4,231,690 | 11/1980 | Burns | 408/111 X |
| 4,284,373 | 8/1981 | Wolff | 408/712 X |

FOREIGN PATENT DOCUMENTS

| | | | |
|---|---|---|---|
| 143047 | 7/1980 | Fed. Rep. of Germany | 408/712 |
| 578021 | 9/1924 | France | 408/712 |
| 1206268 | 12/1965 | German Democratic Rep. | 408/712 |

*Primary Examiner*—William R. Briggs
*Assistant Examiner*—Glenn L. Webb
*Attorney, Agent, or Firm*—Paul L. Hickman

[57] ABSTRACT

A portable drill press mechanism for electric hand drill characterized by a support post, a drill support assembly coupled to the support post, and clamping members removably attached to one or both ends of the support post. The drill support assembly has a drill clamp for attaching the hand drill to a movable carriage under the control of a carriage actuating mechanism. An angular adjustment mechanism is provided in the drill support assembly so that the hand drill can drill holes at various angular orientations relative the support post. Various clamping members are provided for special jobs, such as drilling into a work piece of rectangular cross-section, or drilling a hole from the inside of a large cylindrical container.

13 Claims, 7 Drawing Figures

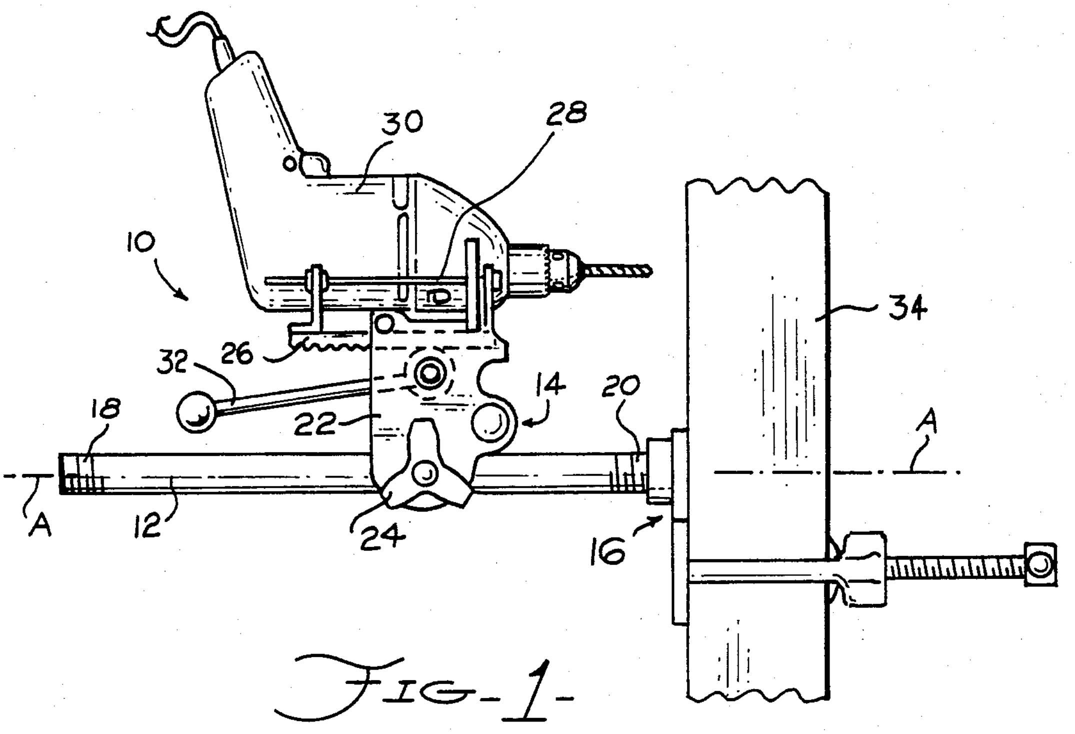
FIG-1-
FIG-2-
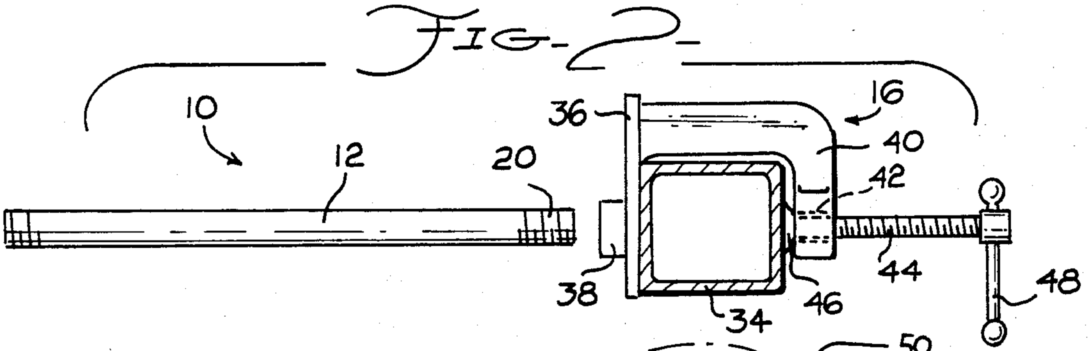
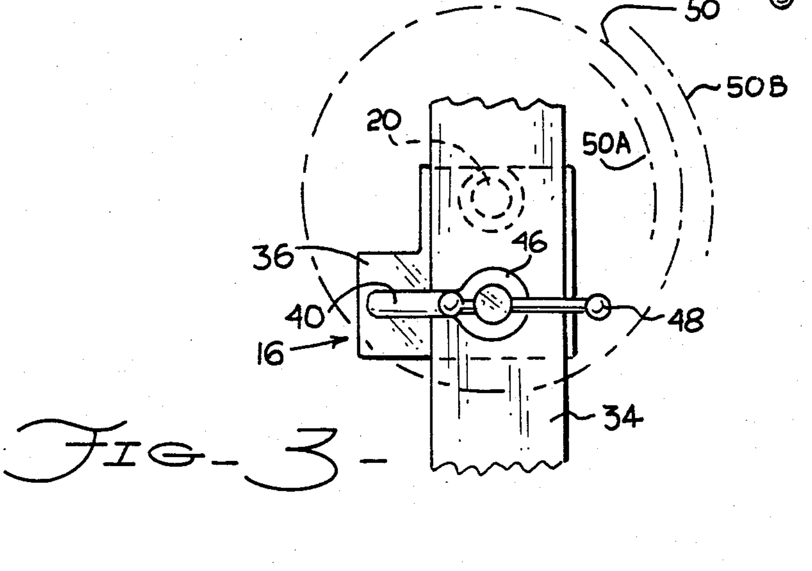
FIG-3-

PORTABLE DRILL PRESS MECHANISM

BACKGROUND OF THE INVENTION

1. Field of the Invention

This invention relates generally to drill press mechanisms and more particularly to portable drill press mechanisms for electric hand drills.

2. Description of the Prior Art

Portable drill press mechanisms are known in the prior art. For example in U.S. Pat. No. 4,010,943 of Eft, a drill support and guide apparatus is shown including a pair of guide posts 28, a pair of C clamps 40 attached to the guide posts, and a screw mechanism for urging a power drill 14 towards a work piece 12. U.S. Pat. No. 2,468,358 of Clark teaches a similar mechanism having a slightly different clamping means.

Similar portable drill presses can be found in U.S. Pat. Nos. 2,373,065 of Piersall, 2,625,063 of Hanson, 3,089,357 of Grau, 3,979,165 of Pyle, and 3,810,710 of Ennemoser. All of the above cited patents are characterized by an elongated support post and means of attaching an electrical hand drill to the support post such that the hand drill can be urged in the direction of a work piece by a suitable mechanism.

A disadvantage of prior art portable drill press mechanisms is that they are usually special purpose devices designed to do one or two specialized jobs. For example, the drill press mechanism of Ennemoser has a base plate clamping mechanism which allows it to be used solely for the purpose of drilling out vehicle wheel studs. While other portable drill press mechanisms are slightly more flexible in use, they are all limited by the type of base clamp they use.

A further disadvantage with prior art portable drill press mechanisms is that they are designed to move an electric hand drill in a direction parallel to their support post. Again, this limits their usefulness, since it is often necessary to drill angled holes into a work piece.

SUMMARY OF THE INVENTION

An object of this invention is to provide a portable drill press mechanism which can be used on a variety of work pieces and in a number of working environments.

Another object of this invention is to provide a portable drill press mechanism which can drill into a work piece at a number of user selectable angles.

Briefly, the invention comprises an elongated support post having threads provided at both ends, a drill support assembly coupled to the support post, and a number of interchangable clamping members attached to one or both of the ends of the support post.

The drill support assembly preferably includes a body portion including a angular adjustment mechanism, a post clamp member attaching the body portion to the support post, a carriage attached to the body portion, a carriage actuating mechanism for moving the carriage relative to the body portion, and a drill clamp attached to the carriage and adapted to clamp an electric hand drill thereto. The position of the drill support assembly on the support post can be varied by means of the post clamp member, and the angle at which the hole will be drilled can be varied by means of the angular adjustment mechanism.

A number of clamping mechanisms can be attached to one or both ends of the support posts. For example, a clamping mechanism including a base plate, a nut attached to the base plate and receptive to a threaded end of the support post, and part of a C clamp attached to the other side of the base plate will allow the portable drill press mechanism to be attached to a work piece of rectangular cross section. If a curved shoe is attached to one end of the support post, and a hydraulic ram provided with a second curved shoe is attached to the other end of the guide post, the portable drill press mechanism of this invention can be used to drill holes from inside a cylindrical container such as a boiler.

An advantage of this invention is that the clamping mechanisms that attach to either or both ends of the support post are removable and replacable so that the drill press mechanism can be used for a variety of purposes and under many different working situations.

Another advantage of this invention is that the drill support assembly is angularly adjustable so that the electric hand drill can be moved in angular directions relative to the support post.

These and other objects and advantages of the present invention will no doubt become apparent upon a reading of the following descriptions and a study of the several figures of the drawing.

BRIEF DESCRIPTION OF THE DRAWING

FIG. 1 is a front elevational view of a portable drill press mechanism in accordance with the present invention.

FIG. 2 is a partially disassembled, bottom plan view of the mechanism shown in FIG. 1.

FIG. 3 is a right end view of the mechanism shown in FIG. 2.

DETAILED DESCRIPTION OF THE PREFERRED EMBODIMENT(S)

Figure 4:
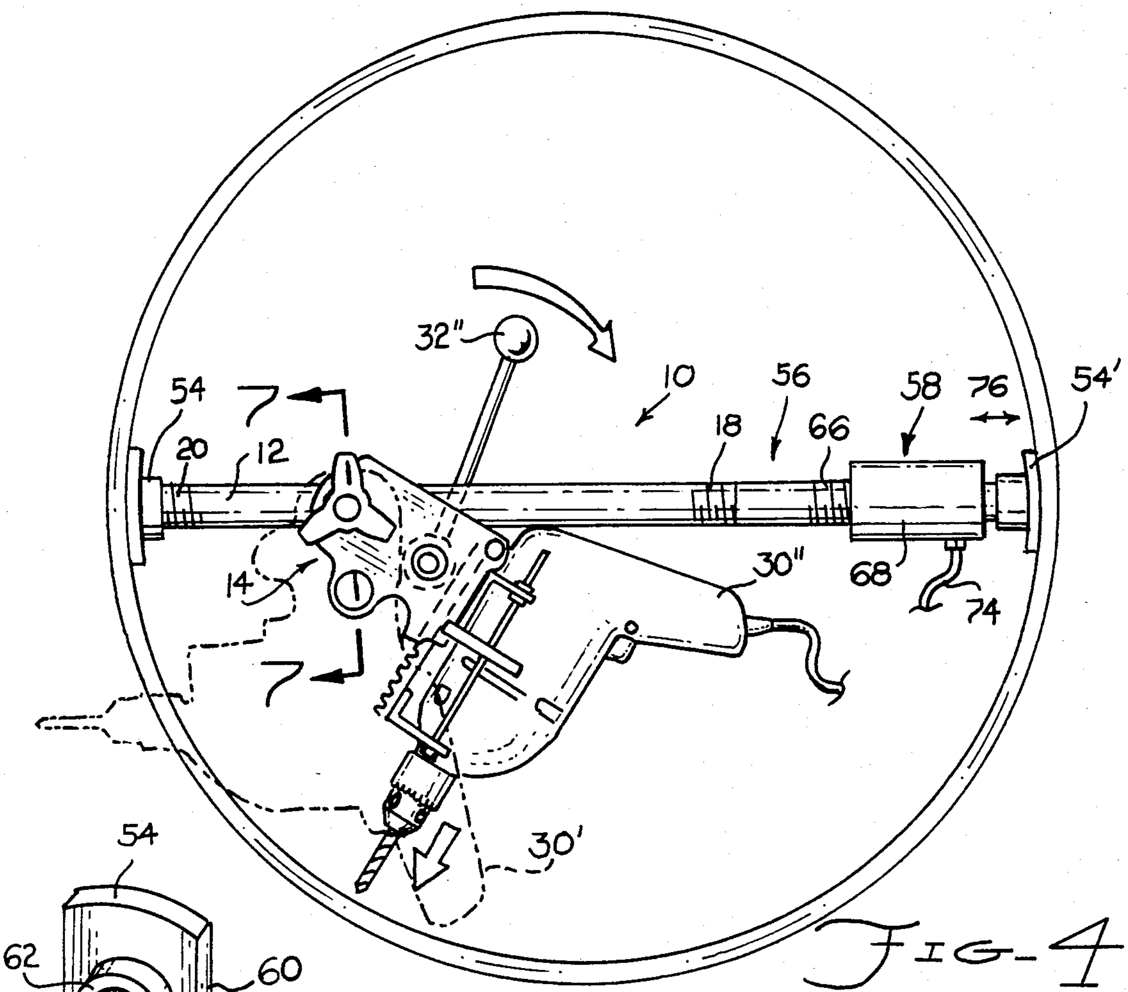
FIG. 4 is a front elevational view of the drill press mechanism having end clamps which allow the mechanism to drill a hole from inside a cylindrical work piece.

Referring to FIG. 1, a portable drill press mechanism 10 in accordance with the present invention includes an elongated support post 12, a drill support assembly 14, and at least one clamping member 16. Support post 12 is preferably an elongated section of a rod or pipe having a longitudinal axis A and provided with threaded end portions 18 and 20.

Figure 6:
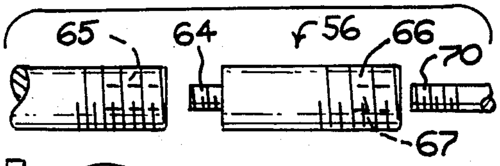
FIG. 6 is a detail view of the extension piece 56 shown in FIG. 4.

Drill support assembly 14 includes a body portion 22, a clamping mechanism 24 for attaching body portion 22 to post 12, a carriage assembly 26 coupled to the body portion, a clamping mechanism 28 attaching an electric hand drill 30 to carriage assembly 26, and a carriage actuating mechanism 32 for moving carriage assembly 26 back and forth. Not shown in FIG. 1 is an angular adjustment mechanism which allows the angular movement of the carriage assembly 26 and thus the hand drill 32 to be varied relative to the longitudinal axis A of support post 12. The workings of the angular adjustment mechanism and the other mechanisms of the drill support assembly will be discussed in greater detail subsequently with reference to FIGS. 6 and 7.

In FIG. 2, drill mechanism 10 is shown in a partially disassembled form with the drill support assembly 14 removed and with support post 12 separated from clamping member 16. Clamping member 16 is particularly adapted to clamp the drill press mechanism 10 to an elongated work piece 34 having a rectangular cross section. The clamping member 16 includes a base plate 36, a nut 38 attached to one side of the base plate, and an L shaped member 40 attached to the other side of the base plate 36 and extending rearwardly therefrom. The L shaped member 40 (which is actually part of a C clamp) is provided with a threaded bore 42 that is receptive to a threaded shaft 44. Attached to one end of threaded shaft 44 is a swivel shoe 46, and attached to the other end of the shaft is a handle 48. As the threaded shaft 44 is rotated by means of handle 48, swivel shoe 46 is urged towards or away from base plate 36 to clamp or unclamp the member 16 from work piece 34.

As seen in FIG. 3, base plate 36 is substantially L shaped so that it conforms as closely as possible to the surface of work piece 34. By loosening clamping mechanism 24, drill support assembly 14 can be rotated around support post 12 to provide a drilling radius as indicated at 50. As indicated at 50A and 50B, as the angular orientation of drill support assembly 14 is varied (as will discussed subsequently) the drilling radius can be decreased or increased from the nominal radius shown at 50. Of course, the reduced or increased drilling radius will also produce angled bore holes in the work piece 34.

Figure 5:
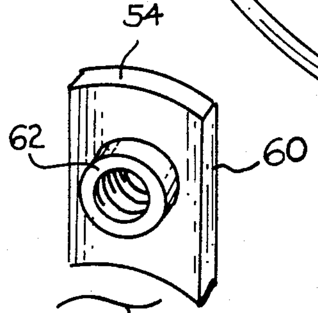
FIG. 5 is a detail view of the clamping shoe 54 shown in FIG. 4.

In FIG. 4, attachments are shown which allows the drill press mechanism 10 to be used to drill holes within a cylindrical work piece 52 such as inside a hot water boiler. To utilize drill press mechanism 10 under this type of environment, several specialized clamping members are used including a clamping shoe 54 (see also FIG. 5), an extension piece 56, a hydraulic or pneumatic ram assembly 58, and another shoe 54'.

Shoe 54 includes a curved plate 60, and a threaded nut 62 receptive to end 20 of support post 12. With an additional reference to FIG. 6, extension piece 56 includes a threaded post 66 and a threaded stud 64. The threaded stud 64 can engage a threaded bore 65 provided in end 18 of support post 12. The free end of post 66 is provided with a threaded bore 67. The diameter of post 66 is preferably the same as the diameter of post 12. Ram assembly 58 includes a cylinder 68, a threaded stud 70 attached to one end of cylinder 68 and engaging the bore 67 of post 66, and a piston shaft 72 extending out of one end of cylinder 68 and provided with appropriate threads. A fluid pressure (such as from a compressed air or pressurized liquid fluid source) is provided at inlet tube 74 to cause piston shaft 72 to move back and forth as indicated at 76. The shoe 54' engages the end of threaded shaft 72.

In use, a sufficient number of extension pieces 56 are attached to support post 12 so that the entire assembly is slightly less than the internal diameter of work piece 52. A fluid is then applied to inlet 74 to cause piston shaft 72 to extend outwardly from cylinder 68 and to firmly clamp shoe 54 against the inner circumference of work piece 52. The actuating lever of carriage actuating mechanism 32 is then used to cause a drill 30' to bore a hole through the wall of work piece 52. As shown in the figure at 30', the hole that will be bored will be along a chord of the cylindrical work piece 52. By adjusting the angular adjustment means of the drill support assembly 14, the drill can be caused to move to a position 30'' and the actuating mechanism to a position 32''. In this position radial holes can be drilled through the work piece 52.

Figure 7:
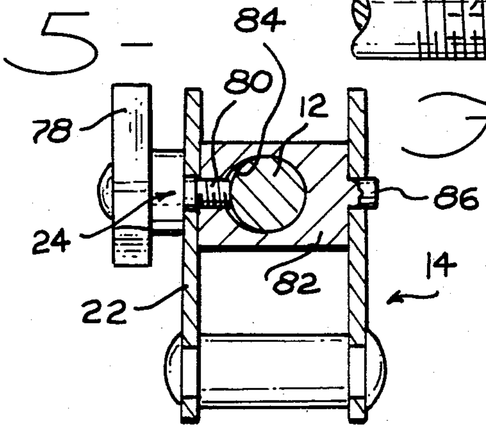
FIG. 7 is a cross sectional view taken along line 7—7 of FIG. 4.

Referring to the cross-section of FIG. 7, the clamping portion 24 includes a handle 78, a threaded stud 80 having one end attached to handle 78 and its other end abutting support post 12, and a swivel member 82 provided with a bore 84 receptive to post 12. Swivel member 84 may pivot around an extension 86 and stud 80 when handle 78 is loosened. In use, when handle 78 is loosened, body portion 22 is free to move up and down post 12 and any extension pieces 56, as well as swivel back and forth as shown in FIG. 4. When handle 78 is tightened, the body portion 22 is locked in position by the tension of clamping mechanism 28.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A portable drill press mechanism for an electric hand drill comprising:

an elongated support post having a longitudinal axis;

a drill support assembly including a body portion, a swivel member provided with a transverse bore through which said post may extend, first pivot means for pivotally attaching a first end of said swivel member to said body portion, set screw means including a threaded stud having a first end engaged with a threaded bore provided in a second end of said swivel member where said stud may cooperate with said pivot means to allow rotation of said swivel member, said set screw means further including handle means attached to a second end of said stud such that rotation of said handle may cause said first end of said stud to engage a portion of said post disposed within said bore, carriage means attached to said body portion, a carriage actuating mechanism for moving said carriage means relative said body portion, and clamping means attached to said carriage means for clamping said electric hand drill to said carriage means; and means attached to a first end of said post to engage a surface of a work piece.

2. A portable drill press mechanism as recited in claim 1 wherein said means attached to a first end of said post is removably attachable to said post.

3. A portable drill press mechanism as recited in claim 1 further comprising means attached to a second end of said post to engage a second surface of said work piece.

4. A portable drill press mechanism as recited in claim 3 wherein said means attached to a second end of said post is removably attachable to said post.

5. A portable drill press mechaism as recited in claim 1 wherein said means attached to a first end of said post includes a base plate, means for removably attaching said base plate to said first end of said support post, an L shaped clamp member attached to said base plate parallel to said longitudinal axis of said support post, and a threaded clamp member engaged with a threaded bore of said L shaped clamp member and adapted to provide a clamping force in the direction of said base plate.

6. A portable drill press mechanism as recited in claim 5 wherein said base plate is L shaped, whereby said first clamping means is adapted to clamp to wôrk piece having a substantially rectangular cross-section.

7. A portable drill press mechanism as recited in claim 4 wherein said means attached to a second end of said post includes means for providing a clamping force in a direction away from said support post.

8. A portable drill press mechanism as recited in claim 7 wherein said means for provding a clamping force provides said force substantially co-axially to said axis of said support post.

9. A portable drill press mechaism as recited in claim 8 wherein said means for providing a clamping force includes a fluid driven ram.

10. A portable drill press mechanism as recited in claim 9 wherein said means attached to a first end of said post includes a first shoe adapted to engage an inner surface of said work piece.

11. A portable drill press mechanism as recited in claim 9 wherein said means for providing a clamping force includes a second shoe attached to said fluid driven ram and adapted to engage an inner surface of said work piece.

12. A portable drill press mechanism as recited in claim 1 further comprising at least a first extension piece coaxially attached to an end of said post, said first extension piece having substantially the same circumference as said post.

13. A portable drill press mechanism as recited in claim 12 further comprising a second extension piece coaxially attached to a free end of said first extension piece, said second extension piece having substantially the same circumference as said first extension piece and said post.

* * * * *